(12) United States Patent
Ackerman et al.

(10) Patent No.: US 6,379,804 B1
(45) Date of Patent: Apr. 30, 2002

(54) COATING SYSTEM CONTAINING SURFACE-PROTECTED METALLIC FLAKE PARTICLES, AND ITS PREPARATION

(75) Inventors: John F. Ackerman, Laramie, WY (US); Andrew J. Skoog, West Chester, OH (US); Jane A. Murphy, Middletown, OH (US); Matthew B. Buczek, Fairfield, OH (US); Brian K. Flandermeyer, Cincinnati, OH (US); Israel S. Jacobs, Schenectady, NY (US); Daniel G. Backman, Melrose, MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/489,715

(22) Filed: Jan. 24, 2000

(51) Int. Cl.[7] .............................................. B32B 15/00
(52) U.S. Cl. ...................................... 428/433; 428/210
(58) Field of Search .......................... 524/439; 428/433, 428/210

(56) References Cited

U.S. PATENT DOCUMENTS

| | | | | |
|---|---|---|---|---|
| 2,418,479 A | | 4/1947 | Pratt et al. | |
| 2,996,709 A | | 8/1961 | Pratt | |
| 4,318,747 A | * | 3/1982 | Ishijima | 106/290 |
| 4,522,655 A | * | 6/1985 | Claasen | 106/290 |
| 4,911,947 A | | 3/1990 | Melcher et al. | |
| 4,937,274 A | * | 6/1990 | Arima | 523/220 |
| 5,091,010 A | * | 2/1992 | Souma | 106/403 |
| 5,221,341 A | * | 6/1993 | Franz | 106/449 |
| 5,322,560 A | * | 6/1994 | DePue | 106/404 |
| 5,630,877 A | | 5/1997 | Kashiwagi et al. | |
| 5,814,686 A | * | 9/1998 | Micale | 523/205 |
| 5,849,817 A | * | 12/1998 | Green | 523/515 |
| 5,931,996 A | * | 8/1999 | Reisser | 106/404 |
| 6,013,203 A | * | 1/2000 | Paneccasio | 252/512 |

* cited by examiner

Primary Examiner—Paul R. Michl
(74) Attorney, Agent, or Firm—David L. Narciso; Gregory O. Garmong

(57) ABSTRACT

A coating is prepared by providing a plurality of metallic flake particles, depositing a surface-protective applied layer on the particle surfaces to form protected particles, and mixing the protected particles with a binder precursor to form a coating mixture. The coating mixture is applied to a substrate. The surface-protective applied layer is preferably silica, which is deposited by a sol-gel process from a tetraethyl orthosilicate solution.

15 Claims, 2 Drawing Sheets

COATING SYSTEM CONTAINING SURFACE-PROTECTED METALLIC FLAKE PARTICLES, AND ITS PREPARATION

BACKGROUND OF THE INVENTION

This invention relates to surface coatings, and, more particularly, to a surface coating containing coated flaked metallic particles.

Surface coatings are often applied to substrates to protect the substrates. A familiar type of surface coating is a paint, which typically is applied to protect the substrate from corrosion or other types of damage, and/or to improve its appearance.

In another application, a surface coating may also protect the substrate from excessive heating, thereby aiding in the controlling of the temperature of the substrate. In one example, flaked metallic particles are added to the binders of surface coatings to act as heat reflectors. The metallic particles reflect incident radiation, particularly infrared radiation, preventing the radiation from reaching the substrate and heating it.

The metallic particles serve their heat-reflective function most effectively when their surfaces remain bright and shiny, that is, have a high surface reflectance in the wavelengths of interest. If the surfaces of the metallic particles become dull during service, as a result of oxidation, corrosion, or other causes, their ability to reflect heat is reduced, and the surface coating becomes less effective in protecting the substrate from the incident radiation. The substrate is heated to a higher temperature than would otherwise be the case. Designers must take such possible dulling of the particle surfaces into account in the design of the protected articles.

Oxidation and/or corrosion of the surfaces of the metallic particles may be expected in some practical applications of interest. For example, metallic flake particles may be incorporated into thermal protective coatings used on components of aircraft engines. These components are typically heated to temperatures in excess of 1500° F. during service and exposed to highly corrosive gas turbine exhaust gas. At such temperatures, oxygen and corrosive components of the exhaust gas diffuse through the binder of the coating to the particles and oxidize their surfaces, reducing their ability to reflect incident radiation. The result in a gradual deterioration in the protective capability of the coating. Such deterioration of the particles also results from conventional rusting at lower temperatures.

It has been known to add an excessive amount of the metallic flake particles to the coating with the hope that some will remain effective for longer periods of time, thereby prolonging the protective life of the coating. This approach has the drawback that the protective life of the coating is prolonged only slightly at best, and the other properties of the protective coating may be adversely affected.

There is a need for an improved approach for particles used in heat-reflective coatings that will minimize or avoid deterioration of the coating over extended periods of use. The present invention fulfills this need, and further provides related advantages.

BRIEF SUMMARY OF THE INVENTION

This invention provides coated flaked metallic particles and a method for their production, and a coating containing the particles and a method for its production. The coating contains metallic particles that reflect incident radiation. The coating retains its reflective properties over extended periods of time, either at room or elevated temperatures. It does not require any change in the coating formulation, except to stabilize the metallic particles against deterioration due to oxidation, corrosion, or other environmental surface effects. The present approach therefore allows any otherwise-operable particle material to be used, and is not limiting of the particle types. It also allows the binder of the coating to be selected without regard for its ability to protect the particles, so that it may be optimized for other properties.

A coating system comprises a coating including a binder, and a plurality of metallic flake particles dispersed throughout the binder. The particles have a surface-protective applied layer thereon. The coating is preferably applied to a substrate.

A method for preparing a coating comprises the steps of providing a plurality of metallic flake particles having particle surfaces, providing a binder precursor, depositing a surface-protective applied layer on the particle surfaces to form protected particles, and thereafter mixing the protected particles with the binder precursor to form a coating mixture.

The particles may be of any operable metal including, for example, gold and gold alloys, silver and silver alloys, platinum and platinum alloys, nickel and nickel alloys, and iron and iron alloys such as iron-aluminum alloys and iron-cobalt-aluminum alloys. The binder precursor is a material that hardens, dries, or cures to form the binder of the coating, and may include both organic and inorganic binders. Examples of operable binders include urethanes, epoxies, alumino silicates, or other polymer or ceramic binders.

The surface-protective applied layer may be deposited onto the metallic flake particles by any operable approach, such as vapor deposition, physical vapor deposition, chemical vapor deposition, atomic layer epitaxy, sol-gel processing, electroplating, electroless plating, passivation/pickling chemical treatments, and aqueous or gas-phase chemical surface treatments. The preferred approach is precipitation from solution, as by a sol-gel process. In such a process, the material of the surface-protective applied layer is controllably precipitated from a solution containing a precursor of the surface-protective applied layer. A preferred material for the surface-protective applied layer is silica ($SiO_2$), precipitated at elevated temperature from an alcohol solution of tetraethyl orthosilicate.

The surface-protective material is deposited as a thin layer onto the surfaces of the particles. It passivates and protects the particle surfaces from oxidation, corrosion, and other adverse environmental effects. The particles therefore remain highly reflective for extended periods during service. It is not necessary to add excessive amounts of the metallic particles to maintain the heat reflective performance over extended periods.

The surface-protective applied layer of the present approach is to be distinguished from other types of surface layers, such as native oxide layers. The protective layer of the present approach is applied to the surface of the metallic flake particles, as distinct from being formed by a chemical reaction of the material of the metallic flake particles, such as the thermal oxidation of the material of the metallic flake particles. The present surface-protective applied layer may bond to the surface of its metallic flake particle by a chemical bond.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
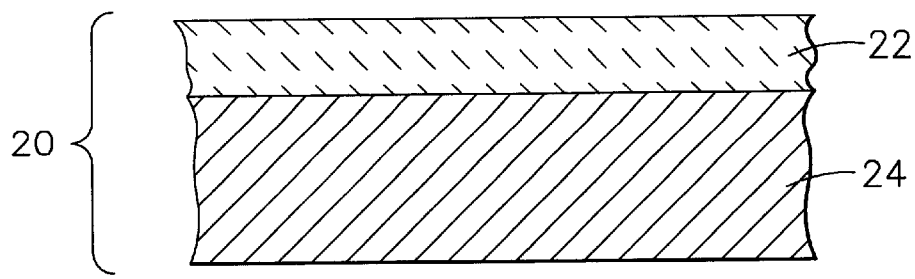
FIG. 1 is a sectional view of a substrate with a coating applied thereto.

FIG. 1 depicts a coating system 20, including a coating 22 affixed to a substrate 24. The structure and preparation of the coating 22 will be discussed subsequently. The substrate 24 may be any operable metallic or nonmetallic material. In an application of interest to the inventors, the substrate is a nickel-base alloy having more nickel than any other element. The substrate is preferably a component of a gas turbine aircraft engine, such as a duct, a combustor, a liner, a flap, a seal, or a centerbody.

Figure 2:
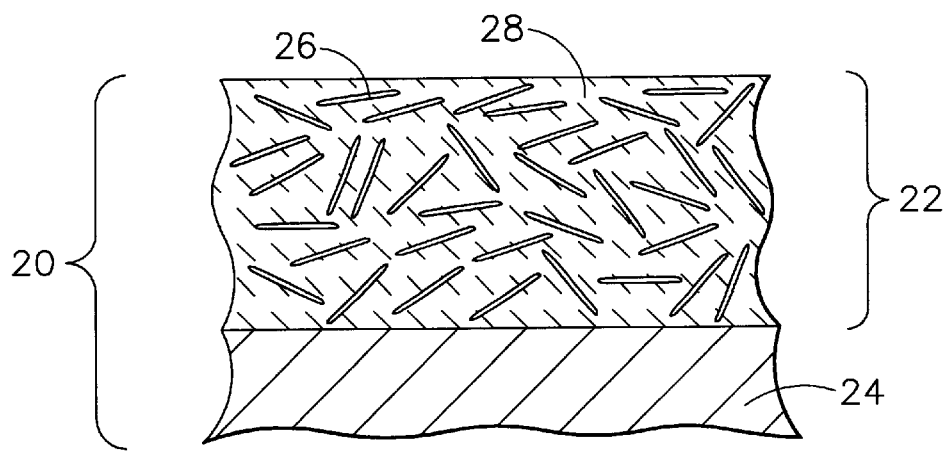
FIG. 2 is an enlarged detail of the coating of FIG. 1.

The coating 22 is depicted in greater detail in FIG. 2, which is not drawn to scale. The coating 22 comprises a plurality of metallic flake particles 26 dispersed throughout a binder 28. Each metallic flake particle 26 has a surface-protective applied layer thereon, as will be discussed subsequently. The binder 28 binds the metallic flake particles 26 together in a unified structure. The coating 22 functions to reflect incident energy over a range of wavelengths, reducing the external heat input to the substrate 24 so that it remains cooler, or requires less cooling, during service.

The metallic flake particles 26 are metallic in composition. Any operable metal may be used for the metallic flake particles 26. Examples of operable compositions of the metallic flake particles include nickel, a nickel alloy, iron, an iron alloy, gold, a gold alloy, silver, a silver alloy, platinum, and a platinum alloy. Some specific examples of operable alloys include a nickel-base alloy known as Permalloy having a composition of about 82 weight percent nickel, 16 weight percent iron, 2 weight percent molybdenum; a binary iron-aluminum alloy having a composition of 90 weight percent iron, 10 weight percent aluminum; and a ternary iron-cobalt-aluminum alloy having a composition of 48 weight percent iron, 40 weight percent cobalt, and 12 weight percent aluminum. The metallic flake particles are characterized by substantially planar shapes with two (lateral) in-plane dimensions much larger (typically at least 10 times larger) than a third through-thickness dimension. The two lateral dimensions need not be the same. Representative dimensions for a typical metallic flake particle 26 are about 1 micrometer thickness and about 20 micrometers in each of the two lateral dimensions, although these dimensions are not critical and may vary substantially.

The binder 28 is preferably a nonmetallic material, such as a ceramic or a cured polymer. Examples of operable ceramics include potassium alumino silicate, alumino silicate, yttria-stabilized zirconium phosphate, and yttria-stabilized alumino phosphate. Examples of operable polymers include urethanes, latexes, epoxies, and elastomers such as Viton™ rubber and fluoroelastomers. The preferred binder 28 is potassium alumino silicate.

The metallic flake particles 26 are typically provided with relatively shiny, reflective surfaces. However, during service the surfaces of the metallic flake particles may oxidize, corrode, or otherwise degrade, resulting in a reduction of their reflectivity, unless protected by the approach described herein. The surface-protective applied layer described herein passivates the surface of each of the metallic flake particles 26, preventing or at least greatly reducing the incidence of such degradation.

Figure 3:
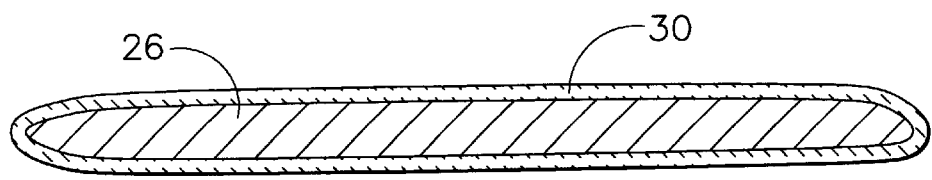
FIG. 3 is a further enlarged detail of the one of the metallic flake particles present in the coating of FIGS. 1 and 2.

FIG. 3, which is not drawn to scale, illustrates one of the metallic flake particles 26 with a surface-protective applied layer 30 thereon. The surface-protective applied layer 30 is preferably a nonmetallic material that is transparent to radiation of the wavelength that is to be reflected by the coating 22. The preferred surface-protective applied layer is silica ($SiO_2$), but other operable surface-protective applied layers such as aluminum oxide and aluminum phosphate may be used. The surface-protective applied layer 30 is preferably thin, on the order of from about 0.01 micrometer to about 1.0 micrometer in thickness. The surface-protective applied layer 30 adheres to the surface of the metallic flake particle 26 and desirably provides a complete envelope around the metallic flake particle 26. Partial coverage of the surface of the metallic flake particle 26, while less desirable, is still operable and within the scope of the invention.

Figure 4:
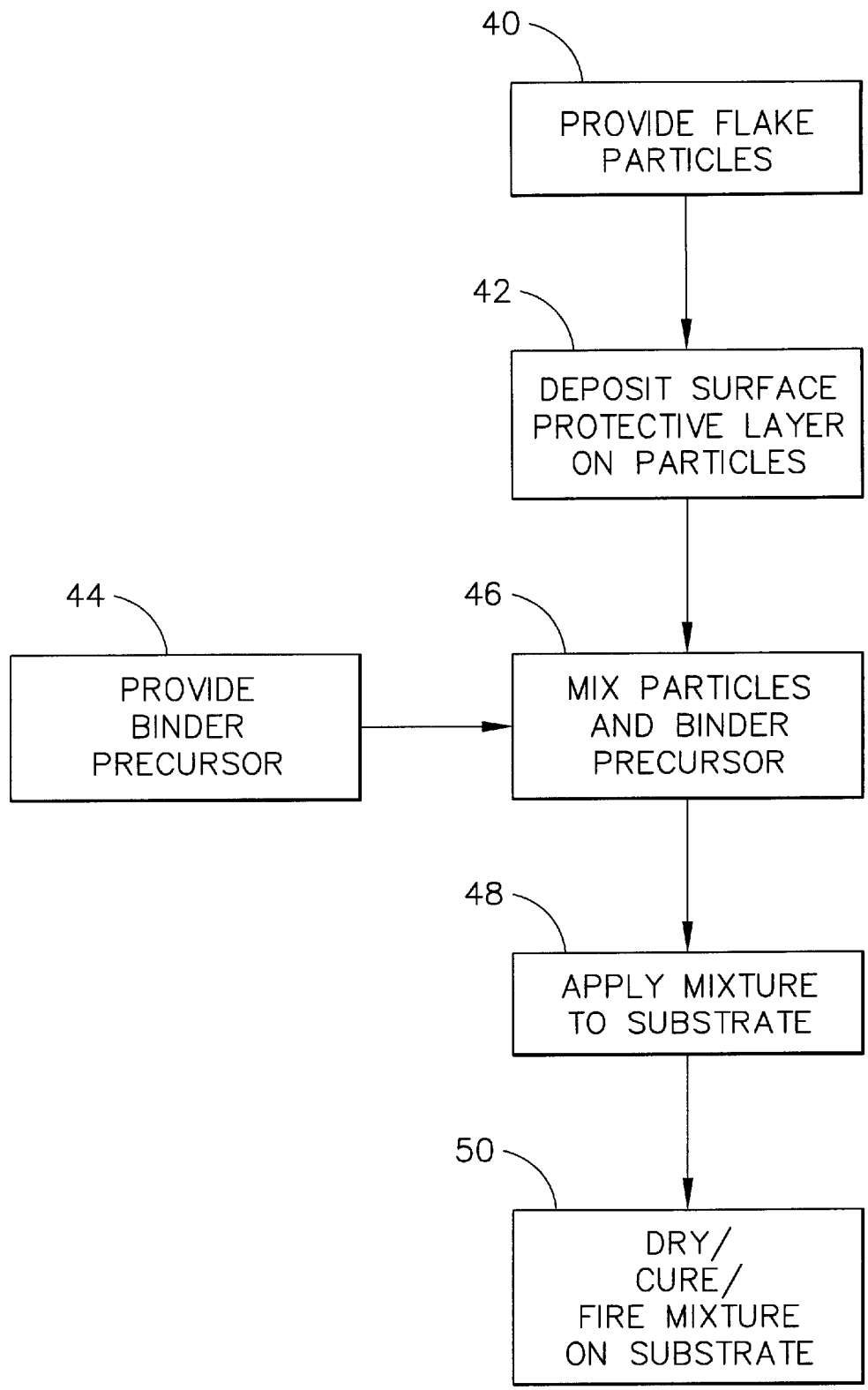
FIG. 4 is a block flow diagram of an approach for preparing a coating.

FIG. 4 depicts a preferred approach to preparing metallic flake particles with a surface-protective layer thereon, and a coating using the protected metallic flake particles. Metallic flake particles 26 are provided, numeral 40. The metallic flake particles may be of any type and from any commercial source, as discussed earlier.

The surface-protective applied layer 30 is deposited on the surface of each metallic flake particle 26, numeral 42. The surface-protective applied layer 30 is preferably deposited by precipitating the surface-protective applied layer onto the surface of the metallic flake particle 26, most preferably by a sol-gel process.

In a preferred embodiment of the sol-gel deposition process, a solution of tetraethyl orthosilicate (TEOS) in pure, water-free (anhydrous) ethyl alcohol is prepared. The solution has a concentration of 58.5 weight percent TEOS in the ethyl alcohol. The metallic flake particles are placed into the TEOS/ethyl alcohol solution in an amount of 0.053 grams of particles per milliliter of solution in a reaction kettle, and heated to boiling at about 90° C. for about six hours. Further processing is as follows, with the stated water additions sized for a total batch size of 125 grams. About 2.5 milliliters of water is added, and boiling is continued for 1 hour. About 2.5 milliliters of water is added, and boiling is continued for 4 hours. About 122.5 milliliters of water is added, and boiling is continued for 16 hours. The container is removed from the heat and allowed to cool continuously with stirring for 16 hours. The flakes are separated from the solution with a filter and allowed to dry as a powder. This processing causes silica ($SiO_2$) to precipitate from the TEOS in solution and onto the surfaces of the metallic flake particles.

In a variation of this process, an additive may be made to increase the adherence of the silica to the surface of the metallic flake particle. A surface-adherence layer is deposited on the metallic flake particles to improve the adherence of the surface-protective applied layer thereto. The surface-adherence layer is usually chosen according to the material of the metallic flake particle. Specifically for the case of an iron-containing metallic flake particle, sufficient triethyl phosphate (TEP) to make a 9.3 percent by weight solution is added to a mixture of ethyl alcohol and metallic flake particles prior to the addition of any TEOS. The mixture of ethyl alcohol, metallic flake particles, and TEP is heated to a temperature of 90° C. Water is added according to the following schedule for a batch size of 125 grams: add 2.27 milliliters of water over a period of one hour and stir for four hours, add 11.4 milliliters of water over the next three hours, and stir for 15 minutes. A very thin layer of phosphate is precipitated onto the surfaces of the metallic flake particles and bonds with the iron in the metallic flake particle. The TEOS is added to the solution, and precipitated with water additions in the manner described above to form the surface-protected layer 30 overlying the phosphate layer on the surfaces of the metallic flake particles 26.

The protective applied layer may be applied to the metallic flake particles 26 by a vapor deposition process such as chemical vapor deposition (CVD). In a preferred approach, the flake particles 26 are fluidized in a fluidized bed within a CVD reaction tube. The fluidization gas is an inert gas such as argon. The CVD reaction tube has a vaporizer attached to it which is heated to vaporize tetra methyl-ortho-silicate (TMOS). The TMOS gas is introduced into the fluidization tube at a temperature of above about 400° C. The thickness of the silica layer deposited onto the metallic flake particles 26 is controlled by the flow rate of TMOS, the time of exposure, and the temperature. For example, to attain a silica layer thickness of about 0.1 micrometer, the flow rate of TMOS is 0.31 grams per second, the exposure time is about 7.5 hours, and the temperature is 982° C. The entire system is vibrated to prevent the formation of clumps and plugs in the fluidization tube. After the desired coating thickness is applied, the fluidization of the bed is continued for 16 hours. Optionally, the heating furnace is ramped up in temperature to about 1900° F. to achieve carbon burnout. During this operation oxygen is introduced to oxidize the carbon. After the processing is complete, the metallic flake particles are removed from the fluidization tube.

The resulting protected metallic flake particles 26 having the surface-protective applied layer 30 thereon are corrosion-resistant, oxidation-resistant, and electrically passivated. These metallic flake particles may be used for any suitable purpose. The preferred application is in a coating, whose preparation will be described next.

The binder precursor is provided, numeral 44. In the preferred case, the binder precursor is potassium alumino silicate. Other binders such as described earlier may be used.

The treated metallic flake particles 26 and binder precursor are mixed together, numeral 46, to form a coating mixture. The particles are present in the mixture of particles and binder in an amount of from about 1 percent to about 70 percent by volume, preferably from about 10 percent to about 15 percent by volume. A carrier liquid may also be added, to thin the mixture to the appropriate consistency for the application procedure that is to be used. For the preferred binder precursor, the preferred carrier liquid is water. The mixing is preferably accomplished by jar mixing the binder on a jar mill with a milling medium. The binder is removed from the jar mill and placed into a beaker, and the metallic flake particles are added and stirred into the binder. The mixture of metallic flake particles and binder is preferably not jar milled with a milling medium, because of the potential for damage to the protective applied layer on the particles.

The coating mixture produced in step 46 is applied to the substrate 24 to be coated, numeral 48. The coating mixture is applied by any operable technique, such as brushing, spraying, wiping, dipping, or tape casting. The coating mixture is applied such that, after subsequent processing, the final coating 22 is from about 0.001 to about 0.250 inch thick, preferably from about 0.030 to about 0.060 inch thick.

The coating mixture applied to the substrate surface is dried, cured, and/or fired as may be appropriate for the particular binder precursor, numeral 50. During this step, the metallic flake particles change little, but the binder reacts according to its chemical makeup.

The present invention has been reduced to practice through step 42 to prepare surface-protected metallic flake particles. Particles of the nickel-base permalloy alloy were prepared with the first-described technique, using only a TEOS/ethyl alcohol solution. Metallic flake particles of the above described binary iron-aluminum alloy and the ternary iron-cobalt-aluminum alloy were first treated with TEP and then with TEOS, in the manner described above. In all three cases, an adherent surface-protective applied layer was formed on the metallic flake particles.

Other techniques may be used for coating the metallic flake particles in step 42. For example, the particles may be coated with a coating metal, which is partially interdiffused with the metallic flake particles to promote adherence and thereafter optionally oxidized. Examples of operable coating metals are chromium, nickel, gold, rhenium, and platinum, and their alloys. The coating metal may be deposited by any operable technique, such as electroplating, electroless plating, chemical adsorption, aqueous-phase or gas-phase chemical surface treatments, or passivation/pickling chemical treatments. The coating metal is deposited to a thickness of less than about 0.1 micrometer, and typically from about 0.01 to about 0.05 micrometers. The metal coating is preferably continuous and pore-free, but some coating defects are tolerated. The diffusion procedure to partially interdiffuse the coating metal with the metallic flake particles is typically accomplished in a non-oxidizing atmosphere at from about 1500° F. to about 2000° F. for 1–2 hours. The optional oxidation step is accomplished in an oxidizing atmosphere at from about 1000° F. to about 2000° F. for 1–2 hours.

Although particular embodiments have been described in detail for purposes of illustration, various modifications and enhancements may be made without departing from the spirit and scope of the invention. Accordingly, the invention is not to be limited except as by the appended claims.

What is claimed is:

1. A method for preparing a material, comprising the steps of
   providing a plurality of metallic flake particles having particle surfaces;
   depositing a surface-protective applied layer on the particle surfaces to form protected metallic flake particles, wherein the surface-protective applied layer is selected from the group consisting of silica, aluminum oxide, and aluminum phosphate;
   providing a binder precursor, wherein the step of providing the binder precursor includes the step of
   providing a ceramic binder precursor; and
   mixing the protected particles with the binder precursor to form a coating mixture.

2. The method of claim 1, wherein the step of providing a plurality of metallic flake particles includes the step of
   providing particles made of a metal selected from the group consisting of nickel, a nickel alloy, iron, an iron alloy, gold, a gold alloy, silver, a silver alloy, platinum, and a platinum alloy.

3. The method of claim 1, wherein the step of depositing includes the step of precipitating the surface-protective applied layer onto the surface of the particles from solution.

4. The method of claim 1, wherein the step of depositing includes the step of depositing the surface-protective applied layer onto the particle surfaces by a sol-gel process.

5. The method of claim 1, wherein the step of depositing includes the step of precipitating a silica-containing surface-protective applied layer onto the surfaces of the particles from tetraethyl orthosilicate at elevated temperature.

6. A method for preparing a material, comprising the steps of providing a plurality of metallic flake particles having particle surfaces; and depositing a surface-protective applied layer on the particle surfaces to form protected metallic flake particles, wherein the step of depositing includes the steps of forming a solution of tetraethyl orthosilicate in anhydrous alcohol, heating the solution to elevated temperature, and controllably adding water to the solution to cause silica to precipitate from the tetraethyl orthosilicate onto the particles.

7. The method of claim 1, wherein the step of depositing includes the step of depositing a silica surface-protective applied layer on the particle surface.

8. The method of claim 1, wherein the step of depositing includes the step of depositing the surface-protective applied layer by vapor deposition.

9. The method of claim 1, wherein the step of depositing is accomplished by a method selected from the group consisting of electroplating, electroless plating, chemical adsorption, aqueous-phase chemical surface treatments, gas-phase chemical surface treatments, and passivation/pickling chemical treatments.

10. The method of claim 1, wherein the step of providing a binder precursor includes the step of providing a ceramic binder precursor selected from the group consisting of potassium alumino silicate, alumino silicate, yttria-stabilized zirconium phosphate, and yttria-stabilized alumino phosphate.

11. The method of claim 1, including an additional step, after the step of mixing, of applying the coating mixture to a substrate.

12. A coating system, comprising a coating including a ceramic binder, and a plurality of metallic flake particles dispersed throughout the binder, the metallic flake particles having a surface-protective applied layer thereon; and a substrate to which the coating is affixed, the substrate being a component of a gas turbine engine.

13. The coating system of claim 12, wherein the surface-protective layer is silica.

14. The coating system of claim 12, wherein the metallic flake particles are made of a material selected from the group consisting of nickel, a nickel alloy, iron, an iron alloy, gold, a gold alloy, silver, a silver alloy, platinum, and a platinum alloy.

15. The coating system of claim 12, wherein the surface-protective layer is selected from the group consisting of silica, aluminum oxide, and aluminum phosphate.

* * * * *